(12) United States Patent
Stephens et al.

(10) Patent No.: US 8,271,550 B2
(45) Date of Patent: Sep. 18, 2012

(54) MEMORY PIECE CATEGORIZATION

(75) Inventors: Arlie Stephens, Sunnyvale, CA (US); Eric Hamilton, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1327 days.

(21) Appl. No.: 11/553,993

(22) Filed: Oct. 27, 2006

(65) Prior Publication Data

US 2008/0104152 A1    May 1, 2008

(51) Int. Cl.
    *G06F 17/30*    (2006.01)
(52) U.S. Cl. .................. 707/813; 345/543; 711/153
(58) Field of Classification Search .......... 707/205–206, 707/813; 345/543; 711/153
    See application file for complete search history.

(56)    References Cited

U.S. PATENT DOCUMENTS

| | | | |
|---|---|---|---|
| 7,143,124 B2 * | 11/2006 | Garthwaite | 707/206 |
| 2006/0085494 A1 * | 4/2006 | Dussud et al. | 707/206 |
| 2007/0130238 A1 * | 6/2007 | Harris et al. | 707/206 |
| 2007/0136402 A1 * | 6/2007 | Grose et al. | 707/206 |

OTHER PUBLICATIONS

The Slab Allocator: An Object-Caching Kernel Memory Allocator, 1994, Jeff Bonwick—Sun Microsystems. http://www.usenix.org/publications/library/proceedings/bos94/full_papers/bonwick.ps.
Dynamic Storage Allocation: A Survey and Critical Review, Paul R. Wilson, Mark S. Johnstone, Michael Neely, and David Boles—Department of Computer Sciences University of Texas at Austin. In International Workshop on Memory Management, Kinorss, Scotland, UK, Sep. 1995, pp. 1-78. ftp://ftp.cs.utexas.edu/pub/garage/allocsrv.ps.

* cited by examiner

*Primary Examiner* — Huawen Peng

(57)    ABSTRACT

A memory management system for managing memory of a processing device and a corresponding method thereof. The system comprises a memory manager and a garbage collector. The memory manager is configured to allocate memory after dividing discrete units of memory into smaller units. The garbage collector is configured to organize a memory availability collection of free units of memory in the memory manager. The collection is ordered based on at least one of the amount of each of the discrete units available and the allocation age of the discrete units.

21 Claims, 10 Drawing Sheets

MEMORY PIECE CATEGORIZATION

BACKGROUND

FIG. 1 depicts a functional block diagram of a portion of an operating system 100 including a memory manager 102 responsible for allocating and de-allocating pieces of memory from a memory pool 104 to requesting processes, e.g., internal memory requester 106 and external memory requester 108, and de-allocating memory space freed from a requesting process to the memory pool. Internal memory requester 106 includes processes, e.g., sets of executable instructions, providing functionality such as one or more of user interface, job management, task management, data management, device management, security and other functionality, within operating system 100 which request memory pieces from memory manager 102. External memory requester 108 includes processes providing functionality such as word processors, web browsers, spreadsheets, photo manipulation software, and other software not a part of the operating system, external to the operating system which request memory pieces from memory manager 102. Memory pool 104 may be a hardware component, a software component, or combined component thereof providing a storage capability.

In response to a request for a piece of memory from one of memory requesters 106, 108, memory manager 102 allocates a piece of memory from memory pool 104. In other instances, memory manager 102 allocates more than one piece of memory at a time.

Memory requesters 106, 108 return allocated memory to memory manager 102 which, in turn, either returns the de-allocated memory to memory pool 104 or re-allocates the memory to one of memory requesters 106, 108 in response to a new request. In returning memory to memory pool 104, memory manager 102 waits until receiving an entire page of memory de-allocated from one or more memory requesters 106, 108 before returning the memory to memory pool 104. That is, memory manager 102 only returns complete pages of memory to memory pool 104.

Due to the unpredictable nature of memory de-allocation by memory requesters 106, 108, it is possible that a memory requester 106, 108 may retain portions of memory indefinitely and thereby prevent the return of a page of memory to memory pool 104. In a period of high memory usage by memory requesters 106, 108, memory manager 102 may acquire and allocate multiple pages of memory from memory pool 104 to the memory requesters. After the high memory usage period passes, memory manager 102 attempts to gather the allocated pages of memory for return to memory pool 104. If a portion of each previously allocated page of memory remains in use by one of the memory requesters 106, 108, memory manager 102 is unable to recover an entire page of memory for return to memory pool 104.

During the period that memory manager 102 attempts to recover entire pages of memory for return to memory pool 104, the memory manager receives additional memory requests from memory requesters 106, 108. Frequently, memory manager 102 fulfills the received memory request by using pieces of pages of memory that have been returned by a previous memory requestor. Thus, reallocation of memory by memory manager 102 in response to memory requests increases the difficulty of gathering all the pieces of any particular page in order to return the page to memory pool 104.

Memory managers, such as memory manager 102, generally operate in one of two ways storing returned memory from memory requesters 106, 108: a first-in, first-out (FIFO) queue and a last-in, first-out (LIFO) queue. A FIFO queue results in the least recently returned memory portion being soonest allocated. A LIFO queue results in recently returned pieces of memory being soonest allocated.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

Figure 1:
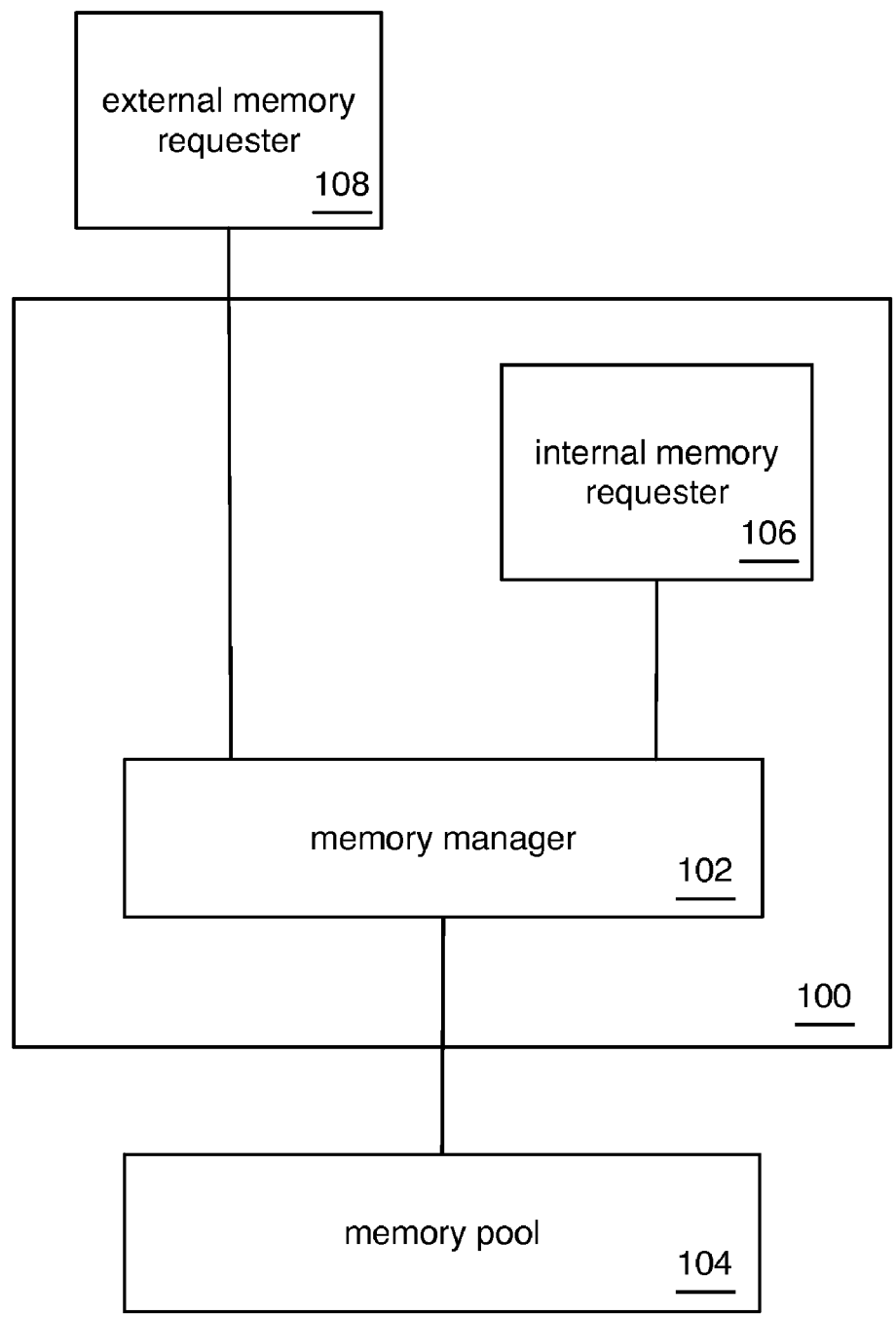
FIG. 1 is a high level functional block diagram of a portion of a processing system.
Figure 2:
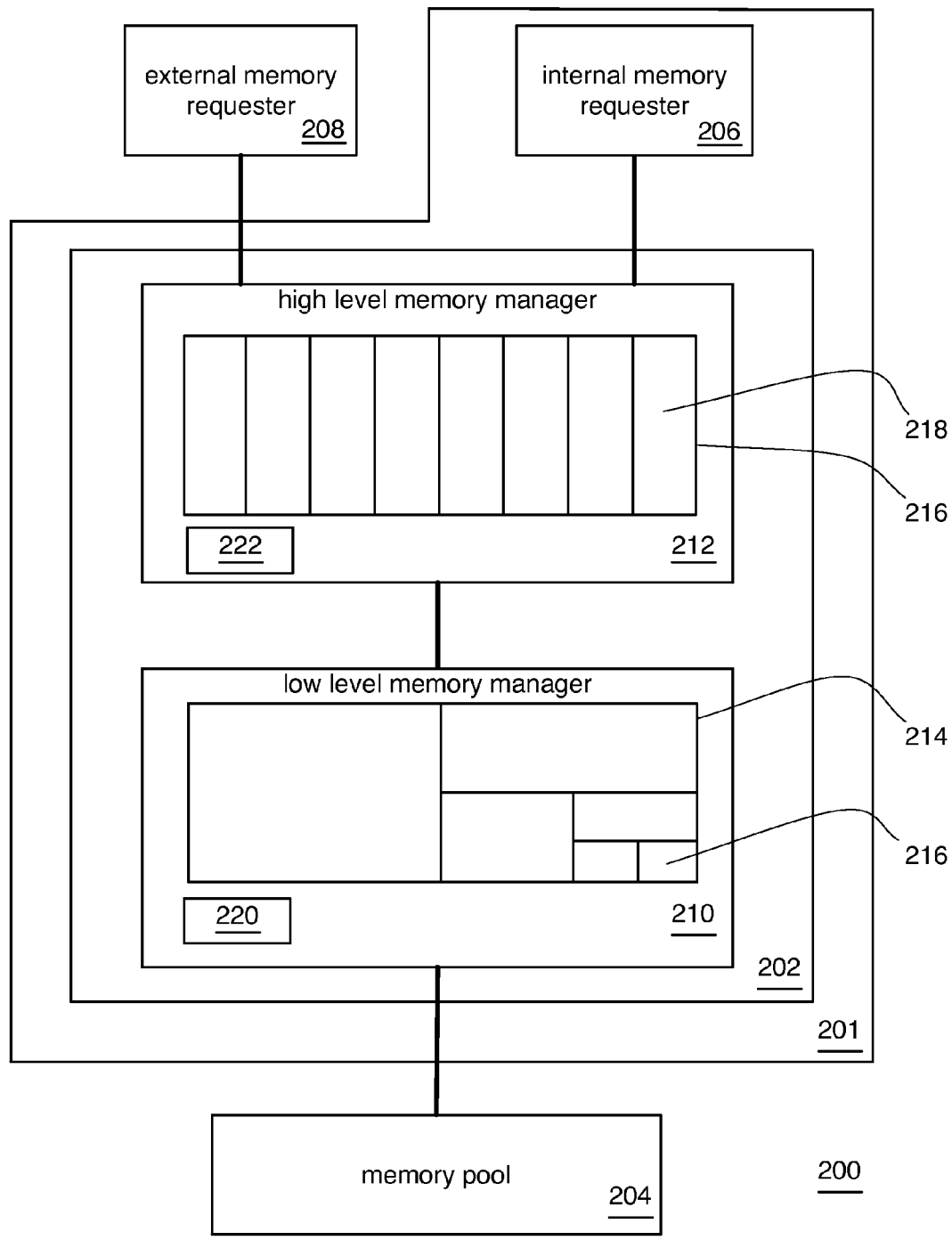
FIG. 2 is a high level functional block diagram of a processing system according to an embodiment.

FIG. 2 depicts a high-level functional block diagram of a portion of a processing device 200. Processing device 200 comprises an operating system 201 which interfaces with a memory pool 204 providing a storage capability. Operating system 201 controls access to portions of memory pool 204 by processes such as memory requesters 206, 208 (similar to the above-described internal and external memory requesters 106, 108). Specifically, a memory manager 202 within operating system 201 controls memory allocation to memory requesters 206, 208. Memory manager 202 is described in further detail below and applies a method of categorizing memory in order to improve the probability of the memory manager being able to accumulate an entire portion of memory for return to memory pool 204.

By performing the below-described method, the amount of memory available from memory pool 204 for other uses by memory manager 202 (and specifically memory requesters 206, 208) is increased and the amount of memory fragmentation of the memory held by the memory manager is reduced. Memory fragmentation is a phenomenon where the memory space remaining available for use becomes divided into many small pieces. Allocating and deallocating ("freeing") pieces of the memory space in many different sizes by memory manager 202 causes memory fragmentation with a result that although free memory space is available from the memory manager, all of the available space may not be usable by memory requesters 206, 208 (e.g., due to not enough contiguous free memory space being available to satisfy a memory request), or may not be efficiently usable by memory requesters.

Internal memory requester 206 comprises processes providing functionality within operating system 201 which request memory from memory manager 202 and external memory requester 208 comprises processes providing functionality external to the operating system which request memory from the memory manager.

Memory pool 204 may be a hardware component and/or an intermediate software component interfaced with a hardware component providing access to memory by memory manager 202.

Memory Manager

Memory manager 202 comprises a low level memory manager 210, also referred to as a large page cache allocator, for interacting with memory pool 204 and a high level memory manager 212, also referred to as an arena allocator, for interacting with the low level memory manager and memory requesters 206, 208.

Low Level Memory Manager

Low level memory manager 210 requests an allocation of memory (termed large pages) from memory pool 204 for subsequent provision as one or more pages of memory to high level memory manager 212 and returns a previously allocated large page of memory to the memory pool after obtaining the one or more pages of memory making up the allocated large page from the high level memory manager 212. With reference to FIG. 2, low level memory manager 210 divides a large page 214 of memory from memory pool 204 into one or more pages 216 of memory.

In an embodiment, low level memory manager 210 uses a buddy allocation method to divide large page 214 into multiple pages 216 of memory. Under the buddy allocation method, low level memory manager 210 divides large page 214 in half and then divides one half of the halved large page 214 in half and so on until the size of each of the two halves meets a predetermined minimum page size threshold 220. In this manner, low level memory manager 210 generates multiple varying sized pages 216 for responding to requests from high level memory manager 212. For example, given a large page 214 having 256 kilobytes (KB) of space and a minimum page size threshold 220 of 8 KB, low level memory manager 210 divides the large page into one page having 128 KB of space and an additional 6 pages having 64 KB, 32 KB, 16 KB, 8 KB, and 8 KB of space. In alternate embodiments, different allocation methods may be applied without departing from the scope and spirit of the present embodiments. Additionally, low level memory manager 210 selects a page 216 having a size larger than the requested amount of memory received from high level memory manager 212 to respond to the high level memory manager memory request.

Although FIG. 2 depicts a single large page 214 within low level memory manager 210, the low level memory manager may comprise more than one large page of memory at a time.

High Level Memory Manager

High level memory manager 212 requests an allocation of a page of memory from low level memory manager 210 for subsequent provision as one or more pieces of memory to memory requesters 206, 208 and returns a previously allocated page of memory to the low level memory manager after receiving the one or more pieces of memory from the memory requesters. With reference to FIG. 2, high level memory manager 212 divides a page 216 of memory from low level memory manager 210 into one or more pieces 218 of memory.

In an embodiment, high level memory manager 212 divides a page 216 of memory into equal-sized pieces 218 of memory based on a predetermined minimum piece size threshold 222. For example, given a page 216 having 8 KB of space and a minimum piece size threshold 222 of 1 KB, high level memory manager 212 divides the page into 8 pieces having 1 KB of space each. In alternate embodiments, different memory division methods, e.g., unequal division of pages, may be applied without departing from the scope and spirit of the present embodiments.

Although FIG. 2 depicts a single page 216 within high level memory manager 212, the high level memory manager may comprise more than one page of memory at a time.

In operation, high level memory manager 212 receives a memory allocation request from an internal memory requester 206 and, if a piece 218 of memory is available in the high level memory manager, returns one or more pieces of memory to the memory requester 208. Internal memory requester 206 uses the allocated memory piece 218, e.g., storing data and information, etc., and high level memory manager 212 considers the allocated memory piece 218 to be retained by the internal memory requester during this allocated period. That is, high level memory manager 212 does not allocate the same piece 218 of memory to more than one memory requester 206, 208.

After internal memory requester 206 finishes using the allocated memory piece 218, the internal memory requester returns ("frees" or "deallocates") the memory piece to high level memory manager 212. At this point, high level memory manager 212 either: retains the piece 218 of memory to fulfill another memory request from a memory requester 206, 208, or returns the memory piece to the low level memory manager 210. If high level memory manager 212 is able to return the freed piece 218 of memory to the low level memory manager 210, the piece 218 of memory is able to be used in other ways, e.g., allocated to a different high level memory manager, allocated to high level memory manager 212 for a different requester, changing hardware attributes of a memory page (such as memory translation, cacheability), etc.

High level memory manager 212 returns memory pieces 218 to low level memory manager 210 in the form of entire pages 216 of freed memory, i.e., the high level memory manager waits until a whole page 216 of freed pieces 218 is available to return the page to the low level memory manager. Because high level memory manager 212 is unable to predict the amount of time a memory requester 206, 208 will retain an allocated memory piece 218, the high level memory manager attempting to return a memory page 216 to low level memory manager 210 may retain freed memory piece(s) 218 and not use available piece(s) of a particular page to fulfill memory requests from memory requesters.

High Level Memory Manager Details

Figure 3:
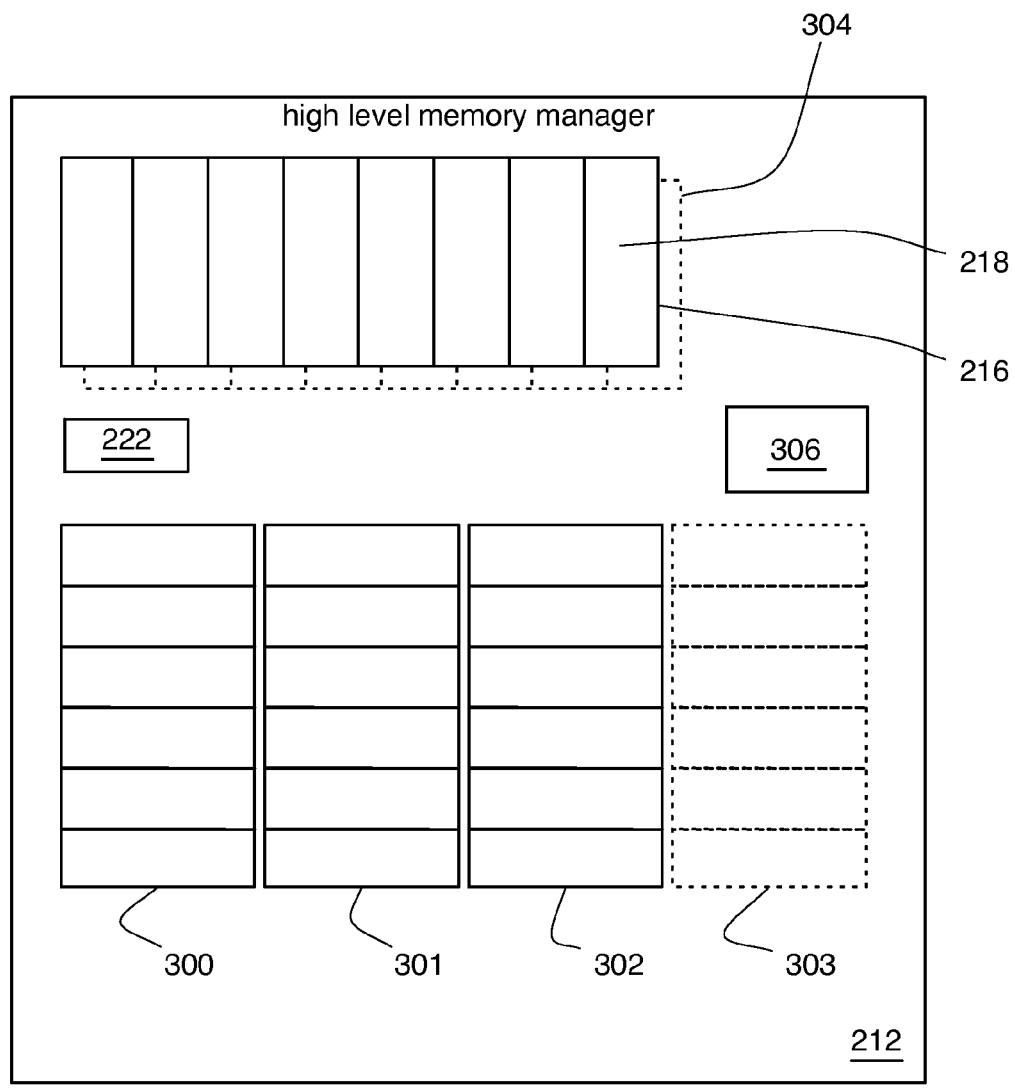
FIG. 3 is a detail view of a functional block diagram of a FIG. 2 high level memory manager according to an embodiment.

Turning now to FIG. 3, a more detailed block diagram of a portion of high level memory manager 212 depicts a page 216 of memory obtained from low level memory manager 210, minimum piece size threshold 222, and three categorized memory lists 300, 301, and 302. FIG. 3 also depicts another page 304 (dashed line and optional) obtained from low level memory manager 210 and another categorized memory list 303 (dashed line and optional) for an additional categorization of memory pieces 218. FIG. 3 further depicts a garbage collector 306 usable in conjunction with one or more embodiments as described herein. Garbage collector (also referred to as a garbage collection module) is a sequence of executable instructions.

Categorized memory lists 300, 301, 302 store references to freed memory pieces 218 according to a predetermined categorization of the particular memory piece. In other embodiments, high level memory manager 212 comprises greater or fewer numbers of categorized memory lists.

Mostly Free Categorization List

High level memory manager 212 stores references to free memory pieces 218 which are part of a memory page 216 having a higher number of free (or unallocated) memory pieces remaining in the high level memory manager in categorized memory list 300 (also referred to as mostly free (MF) list 300). That is, if a memory page 216 has a ratio of the number of memory pieces 218 allocated to memory requesters 206, 208 compared to the number of memory pieces 218 that remain unallocated in high level memory manager 212 that is below a predetermined threshold, the high level memory manager stores references to the memory pieces from the particular memory page in MF list 300. MF list 300 comprises references to free memory pieces 218 from a memory page 216 whose ratio of allocated to unallocated pieces is below a predetermined threshold.

Mostly Allocated Categorization List

High level memory manager 212 stores references to free memory pieces which are part of a memory page 216 having a lower number of free (or unallocated) memory pieces remaining in the high level memory manager in categorized memory list 301 (also referred to as mostly allocated (MA) list 301). That is, if a memory page 216 has a ratio of the number of memory pieces 218 allocated to memory requesters 206, 208 compared to the number of memory pieces 218 that remain unallocated in high level memory manager 212 that exceeds a predetermined threshold, the high level memory manager stores references to free memory pieces from the particular memory page in MA list 301. MA list 301 comprises references to free memory pieces 218 from a memory page 216 whose ratio of allocated to unallocated pieces exceeds a threshold.

The above-described MF list 300 and MA list 301 provide a mechanism for high level memory manager 212 to categorize memory pieces 218. In another embodiment, high level memory manager 212 comprises and uses a third categorization list to categorize memory pieces 218 which do not fit into MF list 300 or MA list 301. In still other embodiments, other data structures may be used, e.g., a single sorted list, a tree structure or heap, etc.

Uncategorized List

High level memory manager 212 stores references to free memory pieces 218 which are from memory pages 216 that are between mostly free and mostly allocated on an uncategorized list 302. Additionally, memory pieces 218 which have not been categorized may be placed on uncategorized list 302. After a memory piece 218 is categorized by high level memory manager 212, the high level memory manager moves the reference from uncategorized list 302 to the appropriate one of MF list 300 and MA list 301.

In further embodiments, additional memory categorization lists may be used by high level memory manager 212 to categorize memory pieces 218.

High level memory manager 212 may perform categorization of memory pieces 218 or, in other embodiments, may use garbage collector 306 to perform the categorization.

In order to operate efficiently and reduce the amount of time memory requesters 206, 208 wait on high level memory manager 212 to fulfill a memory request, the high level memory manager attempts to minimize the amount of time required to fulfill memory allocation requests from the requesters 206, 208. In an embodiment, high level memory manager 212, during the course of responding to memory requests, makes no attempt to determine whether a free page 216 has been accumulated prior to allocating memory to a requester 206, 208.

"Garbage collection" is a process whereby memory is periodically examined to determine when all pieces of a page are unallocated so that the page can be returned to the lower level memory manager. Particular embodiments of the invention take advantage of the already present garbage collection process by performing the above-described additional memory management tasks (categorization) according to one or more of the embodiments in conjunction with a garbage collection process without significantly reducing performance.

In previous embodiments of a high level memory manger, the high level memory manager 212 stores a reference to the free memory piece 218 on a list, e.g., uncategorized list 302, which is periodically scanned by garbage collector 306 to determine whether a complete page has been freed, i.e., whether all of the pieces on a page have been unallocated. In at least some embodiment of the invention, having garbage collector 306 perform the categorization of memory pieces reduces the impact of a potentially time-consuming process from a performance critical path for the allocation and freeing of memory.

Garbage collector 306 categorizes free ("unallocated") memory pieces 218 into MF list 300 and MA list 301 based on the proportion of the memory page 216 which is currently allocated to memory requesters 206, 208. Based on the categorized memory pieces 218, high level memory manager 212 allocates memory pieces 218 from memory pages 216 having the smallest proportion of memory pieces 218 unallocated to memory requesters 206, 208. Stated another way, high level memory manager 212 attempts to retain memory pieces 218 from pages 216 which have a higher proportion of memory pieces 218 unallocated. If high level memory manager 212 has almost all of the pieces of a given memory page 216 in hand, i.e., unallocated to a memory requester, the high level memory manager selects from the remaining memory pieces from pages having a higher allocation of memory pieces in order to satisfy memory requests and thereby increase the chance that the high level memory manager will have the remaining pieces of the given memory page at the time a memory requester returns the last allocated memory piece of the given page. As stated above, high level memory manager 212 fulfills memory requests using pieces 218 from pages 216 which have a larger portion of pieces allocated to memory requesters.

EXAMPLE

Figure 4:
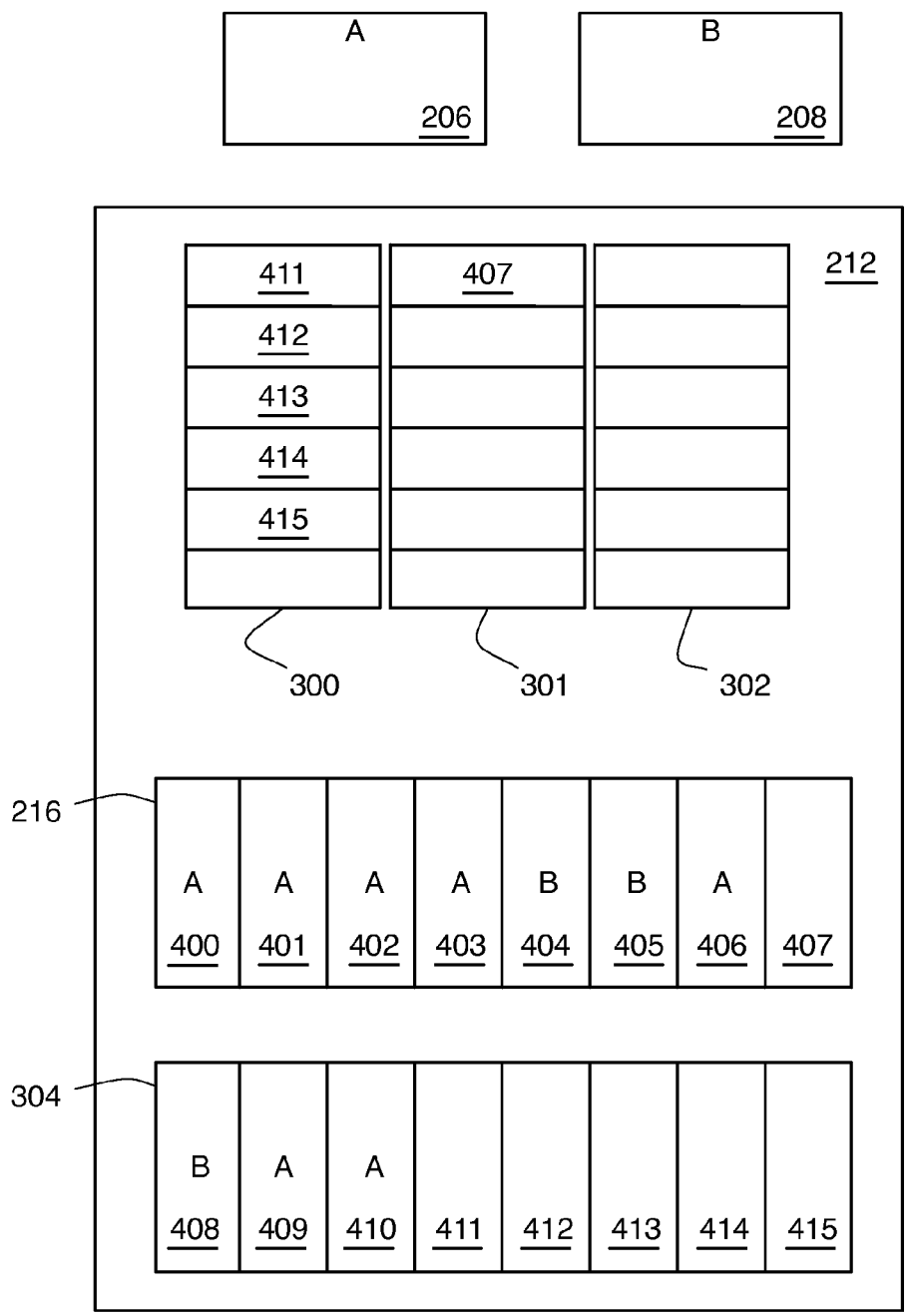
FIG. 4 is a detail view of a functional block diagram of a FIG. 2 high level memory manager according to an embodiment.

An example of memory categorization is useful to describe the above process. FIG. 4 depicts a block diagram of high level memory manager 212 and memory requesters 206, 208 having requested and received memory from the high level memory manager. Specifically, five memory pieces 400-403, and 406 of first memory page 216 and two memory pieces 409, and 410 of second memory page 304 have been allocated to internal memory requester 206 as indicated by the reference A designation in the pieces of the first and second memory pages and two memory pieces 404 and 405 of first memory page 216 and one memory piece 408 of second memory page 304 have been allocated to external memory requester 208 as indicated by the reference B designation in the pieces of the first and second memory pages. As depicted, garbage collector 306 has scanned and categorized the remaining unallocated memory pieces 407, and 411-415 according to the proportion of the corresponding memory page remaining unallocated. Accordingly, garbage collector 306 categorizes and places memory piece 407 on MA list 301 and memory pieces 411-415 on MF list 300. Because more memory pieces than not have been allocated from memory page 216, i.e., 7 (400-406) out of 8 memory pieces of the memory page, the remaining unallocated memory piece 407 belongs to a memory page which is mostly allocated.

Conversely, unallocated memory pieces 411-415 belong to a memory page, i.e., page 304, which is mostly unallocated, i.e., 5 out of 8 memory pieces of the page have not been allocated, and are categorized and placed on MF list 300 by high level memory manager 212, specifically garbage collector 306.

Figure 5:
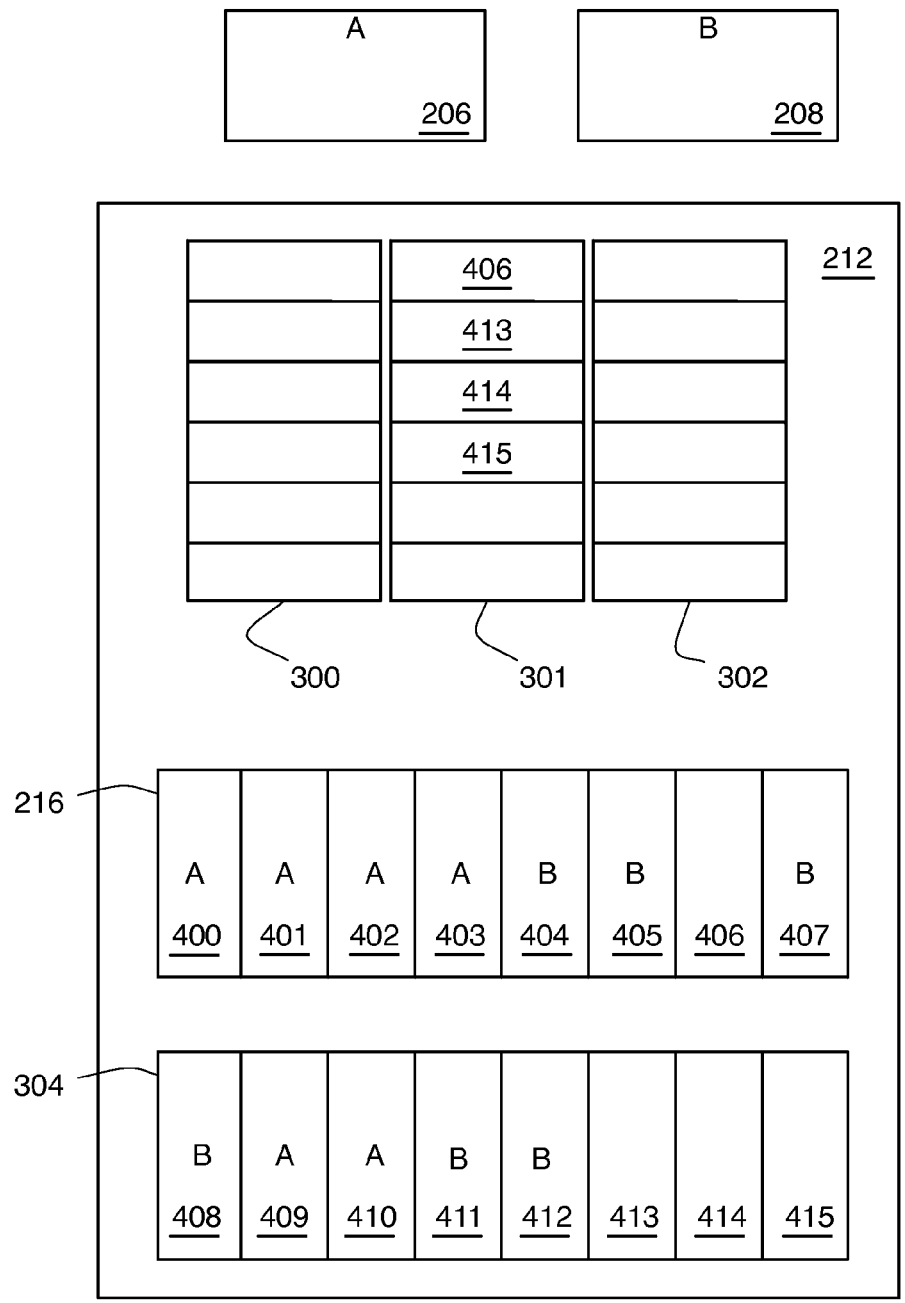
FIG. 5 is a detail view of the FIG. 4 embodiment after a period of time.

FIG. 5 depicts the FIG. 4 block diagram after external memory requester 208 receives three additional memory pieces 407, and 411-412 from high level memory manager 212 in response to a memory request from the external memory requester and after internal memory requester 206 returns memory piece 406 to high level memory manger 212. As a result of the additional memory piece allocation and deallocation, garbage collector 306 categorizes remaining unallocated memory pieces 406 of memory page 216 and pieces 413, 414, and 415 of second memory page 304 as being part of mostly allocated pages and moves the remaining unallocated memory pieces from MF list 300 to MA list 301.

In a particular embodiment, garbage collector 306 compares the proportion of allocated memory pieces of each page to a predetermined allocation proportion in order to determine on which list, i.e., MF list 300 and MA list 301, to place the unallocated memory pieces from the particular page. If the proportion of allocated memory pieces of a particular page exceeds the predetermined allocation proportion, then garbage collector 306 categorizes unallocated memory pieces from the particular page as belonging to a mostly allocated page and places the memory pieces on MA list 301. Otherwise, garbage collector 306 place the memory pieces on MF list 300. In other embodiments, more than one predetermined allocation proportion may be used to allocate memory pieces among more than two memory categorization lists. For example, a series of proportion ranges may be used to categorize memory pages.

In an initial state in which high level memory manager 212 comprises a memory page 216 having no allocated memory pieces 218, i.e., all memory pieces remain unallocated, the memory pieces may be initially placed in uncategorized list 302 until garbage collector 306 executes and categorizes the memory pieces as described above.

In another embodiment, garbage collector 306 sorts the memory pieces 218 on each categorized list 300-302 based on the amount of unallocated memory pieces per memory page 216 relative to other memory pages on the same categorized list 300-302. For example, FIG. 5 depicts a sorted MA list 301 based on the amount of unallocated memory pieces of pages 216, 304. With respect to FIG. 5, memory piece 406 is placed at the top of MA list 301 ahead of memory pieces 413, 414, 415 as more of memory page 216 has been allocated than memory page 304. In this manner, page 216 which is less likely to become completely unallocated is placed before page 304 which is more likely, relative to page 216, to become unallocated and able to be returned to low level memory manager 210. In other embodiments, memory pieces 218 in categorized lists 300-302 are not sorted.

High Level Memory Manager Allocation Process Flow

Figure 6:
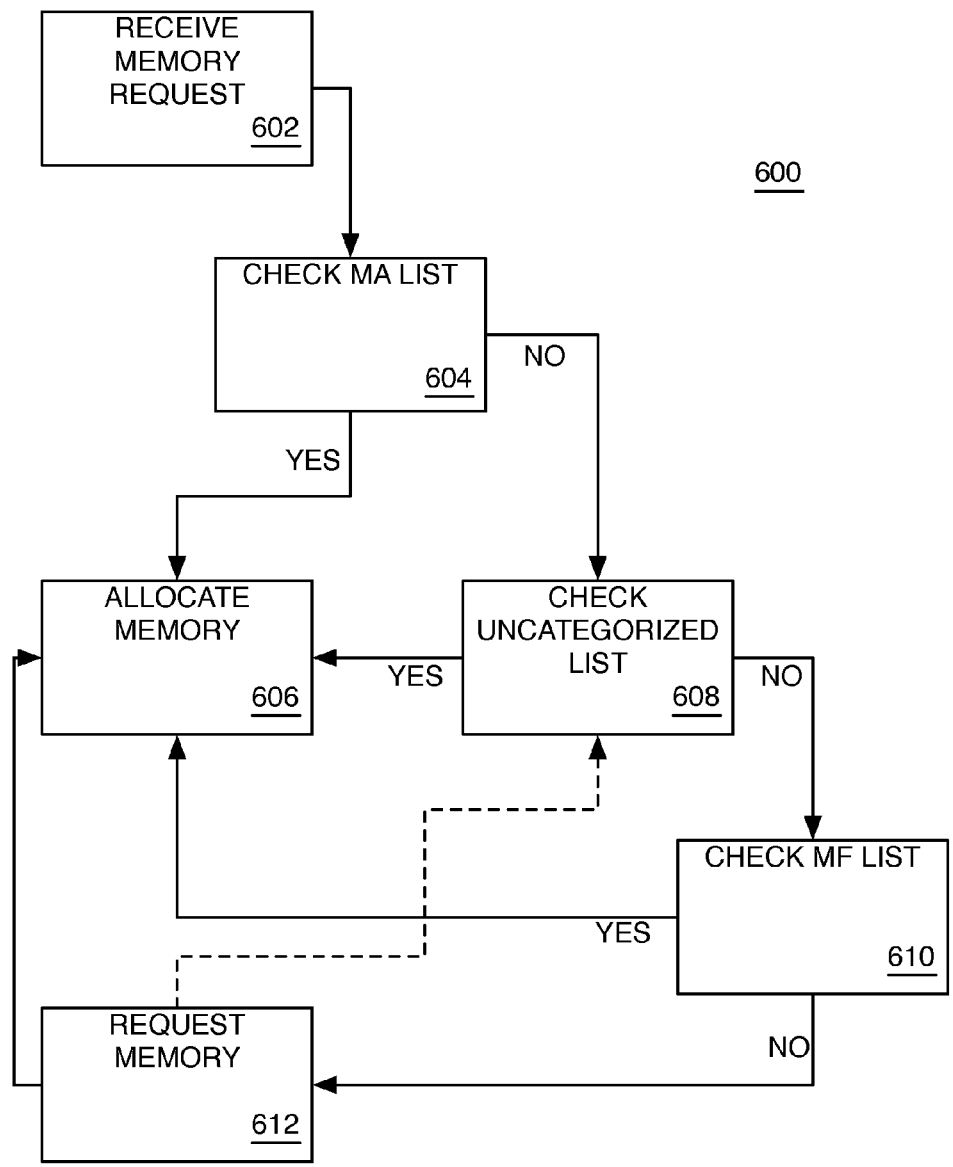
FIG. 6 is a high level process flow diagram of a portion of operation of a memory manager according to an embodiment.

In this manner, categorized memory lists 300-302 provide an order in which high level memory manager 212 proceeds to select memory pieces 218 for fulfilling memory requests from memory requesters 206, 208. FIG. 6 depicts a process flow 600 for allocation of memory performed by high level memory manager 212 responsive to a memory request from memory requesters 206, 208. First, high level memory manager 212 receives a request for an allocation of memory from a memory requester 206, 208 at function 602. The flow proceeds to function 604 and high level memory manager 212 checks MA list 301 for one or more unallocated memory pieces 218 to satisfy the given memory request.

If memory pieces 218 are available to fulfill the memory request, the flow proceeds to function 606 and high level memory manager 212 allocates ("returns") the requested memory to memory requester 206, 208. If memory pieces 218 are unavailable in MA list 201, the flow proceeds to function 608 and high level memory manager 212 checks uncategorized list 302 for one or more unallocated memory pieces 218 to satisfy the given memory request.

Similar to function 604, if memory pieces 218 are available to fulfill the memory request, the flow proceeds to function 606 and high level memory manager 212 allocates the requested memory to memory requester 206, 208. If memory pieces 218 are unavailable in uncategorized list 302, the flow proceeds to function 610 and high level memory manager 212 checks MF list 300 for one or more unallocated memory pieces 218 to satisfy the given memory request.

Similar to functions 604, 608, if memory pieces 218 are available to fulfill the memory request, the flow proceeds to function 606 and high level memory manager 212 allocates the requested memory to memory requester 206, 208. If memory pieces 218 are unavailable in MF list 300, the flow proceeds to function 612 and high level memory manager 212 requests a memory page from low level memory manager 210.

After high level memory manager 212 receives a memory page from low level memory manager 210, the high level memory manager divides the memory page into memory pieces 218 via a memory division method and the flow proceeds to function 606 as described above and the high level memory manager returns the requested memory to memory requester 206, 208.

In another embodiment, after high level memory manager 212 receives a memory page from low level memory manager 210 at function 612, the high level memory manager divides the memory page into memory pieces 218 and places the pieces on uncategorized list 302. The flow proceeds (via dashed line indicated in FIG. 6) to function 608 and execution continues as described above.

By proceeding in the above-described manner, high level memory manager 212 is more likely to allocate memory from memory pages which are mostly allocated than from memory pages which are mostly free. By prioritizing the memory pages having more unallocated pieces over the memory pages having less unallocated pieces, high level memory manager 212 improves the possibility of gathering a complete unallocated memory page for return to low level memory manager 210.

Figure 7:
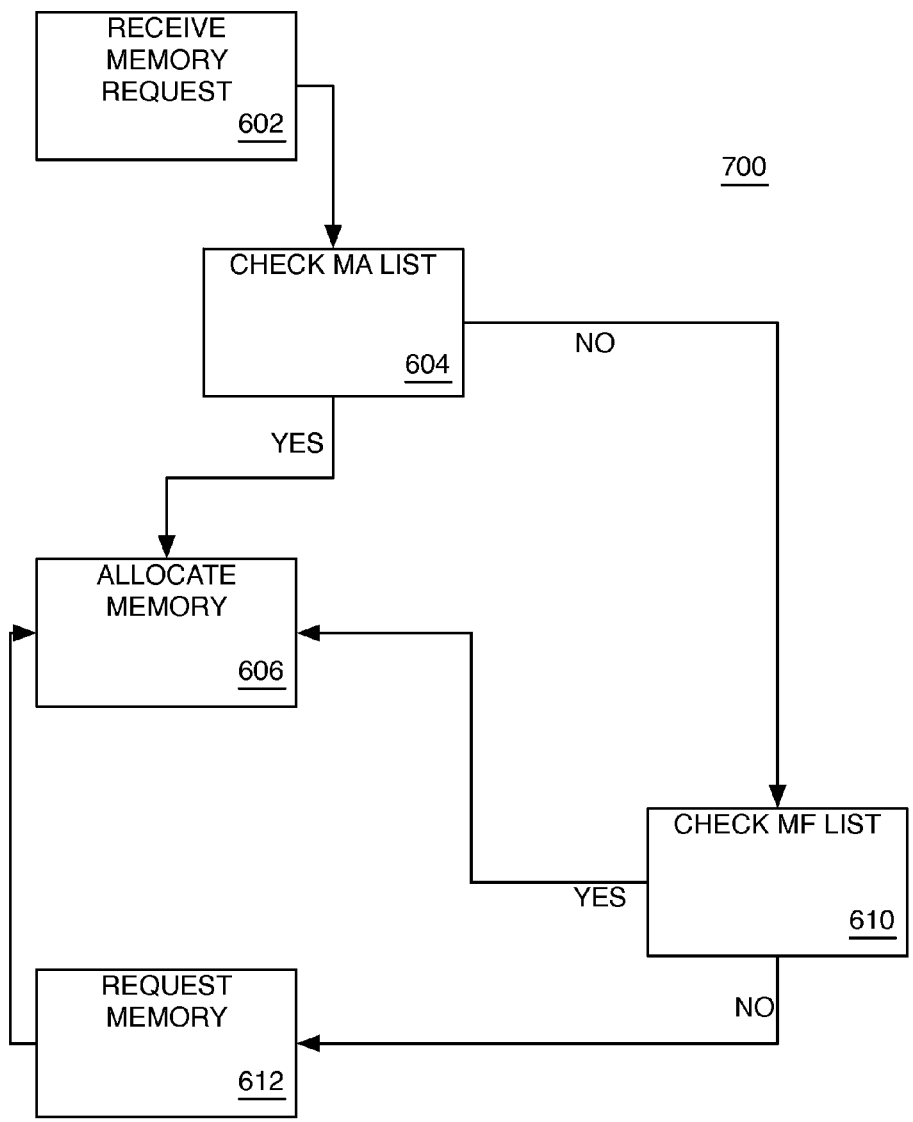
FIG. 7 is a high level process flow diagram of a portion of operation of a memory manager according to another embodiment.

FIG. 7 depicts a version of the FIG. 6 embodiment in which an uncategorized list 302 is unavailable or not used. Process flow 700 proceeds similar to process flow 600 with the exception that the check of uncategorized list 302 at function 608 is not performed.

Garbage Collector Process Flow

Figure 8:
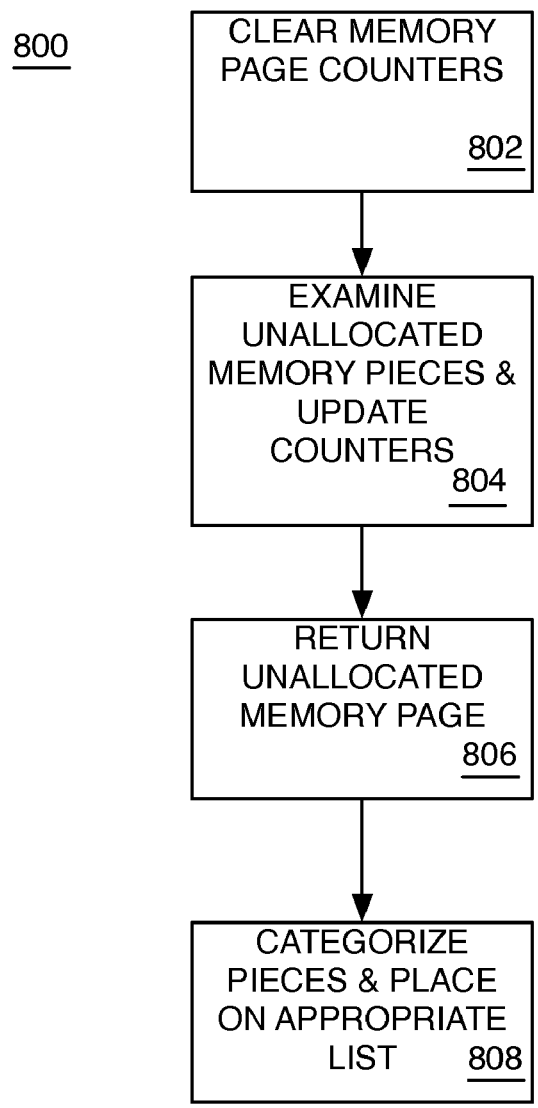
FIG. 8 is a high level process flow diagram of a portion of operation of a garbage collector according to an embodiment.

FIG. 8 depicts a process flow 800 of a portion of the operation of garbage collector 306 according to an embodiment. In accordance with the embodiment, garbage collector 306 maintains a counter for each memory page, e.g., memory page 216, allocated to high level memory manager 212. The counter stores a value representing the number of unallocated memory pieces for a given memory page. In accordance with the embodiment, each memory page 216 is subdivided into a predetermined number of memory pieces. Based on the counter value, garbage collector 306 is able to determine a proportion of unallocated memory pieces for each memory page. The proportion of unallocated memory pieces is used as described above.

In at least some embodiments, garbage collector 306 maintains an additional ratio counter storing a value representing the proportion of unallocated memory pieces for each memory page.

The flow begins at function 802 and garbage collector 306 clears the counter(s) for each memory page, i.e., the garbage collector resets the counter(s) to a default value, e.g., zero. In at least some embodiments, function 802 may be omitted and the counter values updated as described below by execution of garbage collector 306.

The flow proceeds to function 804 and garbage collector 306 examines unallocated memory pieces of each memory page and updates the value stored in a corresponding counter(s). Garbage collector 306 determines the number of unallocated memory pieces for each memory page and stores the number in a counter for the particular memory page.

The flow then proceeds to function 806 and garbage collector 306 determines whether memory page(s) includes only unallocated memory pieces and, if so, the garbage collector 306 returns the unallocated memory page(s) to low level memory manager 210. That is, garbage collector 306 evaluates whether all of the memory pieces of a particular memory page are unallocated.

The flow then proceeds to function 808 and garbage collector 306 categorizes unallocated memory pieces 218 in order to determine whether to place the memory piece on MA list 301 or MF list 300. Garbage collector 306 places unallocated memory pieces 218 from a memory page 216 having a higher proportion of allocated memory pieces than unallocated memory pieces on MA list 301 based on the above-described counter(s). Garbage collector 306 places unallocated memory pieces 218 from a memory page 216 having a higher proportion of unallocated memory pieces than unallocated memory pieces on MF list 300 based on the above-described counter(s).

In another embodiment having more than a single categorized memory list where each list corresponds to a particular range of proportions of unallocated memory pieces per memory page, garbage collector 306 determines within which range of a predetermined allocation proportion the memory page 216 of the memory pieces 218 fits and places the memory pieces 218 on the corresponding list.

In at least some other embodiments, one or more of process functions 804, 806, and 808 of process flow 800 may be performed concurrently. Additionally, in other embodiments, different and/or supplemental parameters may be used by garbage collector 306 in categorizing memory pieces 218, e.g., performance requirements, anticipated memory request "spikes," the number of requesting devices and other computational considerations. The parameters may be dynamically generated, or set to a predetermined value and/or be contingent on performance of the processing device.

In at least some other embodiments, a particular memory page may be divided into unequal sized memory pieces. In accordance with this particular embodiment, the above-described counter mechanism may store the amount of unallocated memory space of the unallocated memory pieces.

In at least some other embodiments, an aging process related to the memory allocation is used for categorizing memory pieces. For example, a long-lived list and a short-lived list may be used to indicate the age of the longest-lived allocation of a given memory piece from a particular memory page. Thus, memory pages having memory piece allocations which have been allocated longer in comparison with other allocations are less likely to become unallocated such that the memory page is able to be returned to low level memory manager 210.

In at least one embodiment according to the above-described aging allocation mechanism, garbage collector 306 stores a sequence of values for a memory page corresponding to the memory pieces of the memory page and indicating which memory pieces are unallocated. During the operation of garbage collector 306, the garbage collector updates the sequence of values to indicate which memory pieces are allocated, e.g., by use of one or more bitmaps. Each time garbage collector 306 updates the values, the garbage collector performs an operation, e.g., a logical AND, using the current values and one or more of previous values. For example, garbage collector 306 may perform an AND operation combining the three most recent sequence of values to determine which values have not changed, thereby indicating which memory piece allocations are longer lived in comparison to other memory piece allocations. That is, in some embodiments, an allocation age, i.e., the age or length of time of the allocation of a memory piece, is used to categorize memory pieces.

In accordance with the aging allocation and at least some embodiments, one approach is to then categorize memory pieces based on the age of the longest lived allocation of a memory piece of a given memory page and another approach is to categorize memory pieces based on the number of long lived memory piece allocations.

In the above-discussed embodiments, even though the "categorizations" performed by garbage collector 306 on the categorized memory lists 300-302 may become outdated, the categorized lists provide improved memory allocation and/or reduced fragmentation.

In at least some embodiments, garbage collector 306 process flow 800 executes periodically and in other embodiments the process flow executes based on a memory allocation and/or a memory deallocation by a memory requester 206, 208. That is, each time a memory requester 206, 208 receives memory from high level memory manager 212 and/or returns memory to the high level memory manager, garbage collector 306 executes process flow 800. In still further embodiments, another garbage collector executes a similar process flow to process flow 800 with respect to memory pages 216 of low level memory manager 210 based on a memory allocation by high level memory manager 212.

Figure 9:
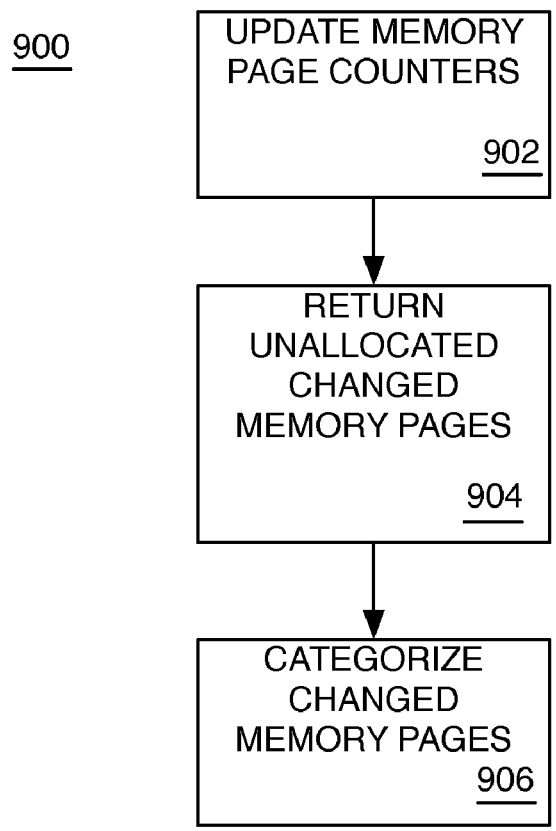
FIG. 9 is a high level process flow diagram of a portion of operation of a garbage collector according to another embodiment.

FIG. 9 depicts a high level process flow 900 of garbage collector 306 according to another embodiment in which the process flow begins at function 902 wherein the garbage collector updates memory page counters similar to function 804 (FIG. 8) responsive to a memory change, e.g., a memory allocation and/or a memory deallocation. The flow then proceeds to function 904, similar to function 806 (FIG. 8), wherein garbage collector 306 returns unallocated changed memory pages to low level memory manager 210. The flow the proceeds to function 906, similar to function 808 (FIG. 8), wherein garbage collector 306 categorizes changed memory pieces of memory pages.

In yet another embodiment, high level memory manager 212 records further information on individual memory pages in order to help prevent memory pieces from the same page from being allocated or released while "sibling" or memory pieces from the same page are being held in one or another categorized memory list. Page tracking reduces the chances in which high level memory manager 212 allocates from MF list 301 so that other memory pieces from the same MF list-based page become preferred for future allocations over other MF list-based pages. If high level memory manager 212 must allocate memory from MF list 300, page tracking enables the high level memory manager to make future memory allocations from the same page in order to reduce the likelihood of moving multiple pieces 218 from MF list 300 to MA list 301. Similarly, tracking memory page information enables the return of unallocated memory pieces to MF list 300.

In accordance with the page tracking embodiment, garbage collector 306 retains "page tracking information" (PTI) for each page 216. In an embodiment, PTI comprises the number of memory pieces 218 allocated for a given memory page 216. Garbage collector 306 counts or tracks the number of pieces outstanding or allocated by high level memory manager 212 and updates the PTI on a memory allocation (function 606 of FIG. 6), on a memory release by a memory requester, or both. In at least some embodiments, garbage collector 306 updates the PTI on each memory allocation.

The availability of each memory page 216 as stored in the PTI is updated and the respective memory pieces 218 are categorized by garbage collector 306. In an embodiment, garbage collector 306 determines the matching memory page by parsing the first or target "digit" of the hex address of the memory piece 218 to be categorized. For example, "2ea5" would be memory page "2" if the page of memory were 4096 bytes in length. However, in other embodiments, pages may be other sizes or other indices, without limiting the scope of the embodiments.

Low Level Memory Manager Discussion

Returning now to FIG. 2, low level memory manager 210 manages large-sized memory allocations (pages 216) of memory from pool 204. Low level memory manager 210 comprises different-sized memory pages 216 of which a smaller number than memory pieces 218 in high level memory manager 212 are in use at the same time. The performance of low level memory manager 210 in executing memory allocation and memory release functions is not necessarily as time critical as in the high-level memory management embodiment 212 described above. However, as depicted in FIG. 2, low level memory manager 210 divides large pages 214 into memory pages 216 of different sizes, which adds an extra level of complexity, not present in high level memory manage 212.

Because low level memory manager 210 divides large pages 214 into smaller pages 216, low level memory manager is subject to lower performance requirements than high level memory manager 212. Therefore, low level memory manager 210 need not be as complex as high level memory manager 210.

Figure 10:
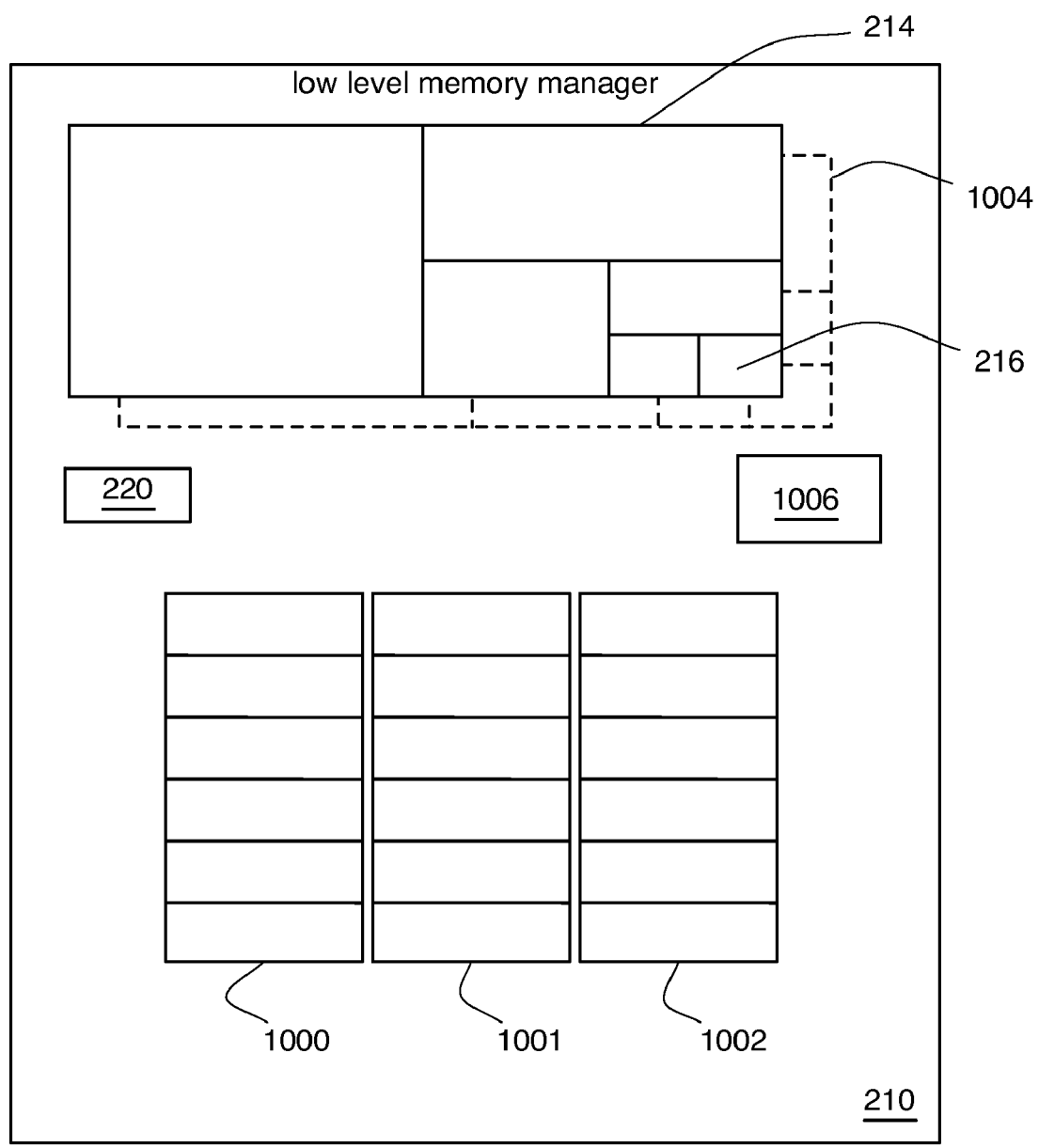
FIG. 10 is a detail view of a functional block diagram of a FIG. 2 low level memory manager according to an embodiment.

FIG. 10 depicts a detail view of low level memory manager 210 (FIG. 2) similar to high level memory manager 212 including an MF list 1000, an MA list 1001, an uncategorized list 1002, an optional large page 1004 (dashed line) of memory, and a garbage collector 1006. Similar to high level memory manager 212, low level memory manager 210 may comprise one or more additional large pages as indicated by optional large page 1004 (dashed line).

Further, low level memory manager 210 comprises categorized memory lists 1000-1002 for organizing unallocated memory pages 216 similar to organization of unallocated memory pieces 218 by high level memory manager 212. In an embodiment, low level memory manager 210 operates in the same fashion with respect to large pages 214, pages 216, and high level memory manager 212 as the high level memory manager operates with respect to pages 216, and memory pieces 218, and memory requesters 206, 208 (FIGS. 6, 7). Further, low level memory manager 210 comprises functionality similar to garbage collector 306 in garbage collector 1006. In an embodiment, low level memory manager 210 comprises the described garbage collector 1006 functionality directly without a separate garbage collector component.

In one or more embodiments, operating system 201 further includes a physical memory allocator (not shown) and a kernel virtual address component (not shown) between memory manager 202 and memory pool 204.

In another embodiment, a single categorization list, e.g., a single-linked or a double-linked categorization list, may be used in a sorted list fashion to categorize free memory in the memory managers 210, 212. However, a single-linked or double-linked categorization list requires additional time of an already time-critical memory allocation and deallocation path and/or increase the amount of memory required in an area with tight memory restrictions.

What is claimed is:

1. A memory management system for managing memory of a processing device, comprising:
    a memory;
    a memory manager configured to allocate memory, said memory manager configured to allocate memory from a memory availability collection ordered based on a collection order of free units of memory, after dividing discrete units of memory into smaller units; and
    a garbage collector, wherein said garbage collector is configured to organize said memory availability collection of free units of memory in said memory manager, said collection ordered based on at least a longest lived allocation age of the discrete units.

2. A memory management system as recited in claim 1, wherein said garbage collector organizes said memory availability by dividing said collection into at least two categories.

3. A memory management system as recited in claim 2, wherein said at least two categories are defined by a portion of said discrete memory unit available in said free memory.

4. A memory management system as recited in claim 2, wherein said garbage collector tracks the number of available subunits of each of said discrete units in said collection.

5. A memory management system as recited in claim 1, wherein said collection is ordered based on the allocation age for which the longest lived smaller units within said discrete units have been allocated.

6. A memory management system as recited in claim 1, wherein a low level memory manager is configured to allocate memory in discrete units provides memory to said memory manager.

7. A computer-implemented method of allocating memory comprising:
    receiving, with a processor, a request for unallocated memory;
    selecting an appropriate piece of available memory from a collection of available memory pieces, wherein one or more memory pieces comprise a memory page and wherein said selection is based on choosing a memory piece from the page of memory having the longest lived allocation age of a memory piece; and
    allocating said appropriate piece of memory.

8. A computer-implemented method as recited in claim 7, further comprising: dividing at least one unallocated page of memory into subunits and wherein said available memory pieces consist of said subunits.

9. A computer-implemented method as recited in claim 7, wherein said division of a page of memory is in response to said request, wherein said selecting does not provide enough subunits of a single page to respond to said request.

10. A computer-implemented method as recited in claim 8, wherein said subunits are a binary fraction of at least one page of memory.

11. A computer-implemented method as recited in claim 7, further comprising: ordering said collection of available memory pieces based on the portion of each of all pages of memory available in said collection.

12. A computer-implemented method as recited in claim 11, wherein said ordering of pieces of available memory is from least available portion to most available portion, whereby pieces of memory from said most available portion of a page of memory are allocated last.

13. A method for managing memory in a device having a processor, comprising:
   associating portions of unallocated memory with one of a set of pages of memory; and
   categorizing said memory based on at least a longest lived allocation age of an allocated memory from said one of said set of pages of memory.

14. A method as recited in claim 13, further comprising: allocating categorized memory from the least available portions of said set of pages first.

15. The method as recited in claim 13, further comprising: determining that a process that was using allocated memory has deallocated said allocated memory prior to said associating.

16. The method as recited in claim 15, further comprising: associating said released memory before performing said categorizing.

17. A method as recited in claim 14, further comprising generating sublists from said available memory, wherein each said sublist has an indicator being for said portion of a page available.

18. A method as recited in claim 17, wherein said indicator is a range of portions of memory available from each page.

19. A method as recited claim 13, wherein an index is associated with the amount of a particular memory page that remains available for allocation.

20. A non-transitory computer-readable storage medium storing instructions which, when executed by a processor, cause the processor to receive a request for unallocated memory; select an appropriate piece of available memory from a collection of available memory pieces, wherein one or more memory pieces comprise a memory page and wherein said selection is based on choosing a memory piece from at least the page of memory having a memory piece having the longest lived allocation age; and allocate said appropriate piece of memory.

21. A memory or a computer-readable medium as recited in claim 20 storing further instructions which, when executed by a processor, cause the processor to associate portions of unallocated memory with one of a set of pages of memory; and categorize said memory based on the amount of unallocated memory available from said one of said pages of memory.

* * * * *